(12) United States Patent
Helms et al.

(10) Patent No.: US 9,225,929 B2
(45) Date of Patent: Dec. 29, 2015

(54) VIRTUALIZED GREETER SYSTEMS AND METHODS

(71) Applicants: David Lee Helms, Monroe, NC (US); Dale Gillis, Mooresville, NC (US)

(72) Inventors: David Lee Helms, Monroe, NC (US); Dale Gillis, Mooresville, NC (US)

(73) Assignee: Rockport Enterprises, LLC, Mooresville, NC (US)

( * ) Notice: Subject to any disclaimer, the term of this patent is extended or adjusted under 35 U.S.C. 154(b) by 221 days.

(21) Appl. No.: 13/918,455

(22) Filed: Jun. 14, 2013

(65) Prior Publication Data

US 2013/0321716 A1    Dec. 5, 2013

Related U.S. Application Data

(63) Continuation-in-part of application No. 13/401,428, filed on Feb. 21, 2012, now Pat. No. 9,083,931.

(51) Int. Cl.
*H04N 5/74* (2006.01)
*G09F 27/00* (2006.01)
*G09F 19/18* (2006.01)

(52) U.S. Cl.
CPC .............. *H04N 5/74* (2013.01); *G09F 19/18* (2013.01); *G09F 27/00* (2013.01); *G09F 27/005* (2013.01); *G09F 2027/001* (2013.01); *G09F 2027/002* (2013.01)

(58) Field of Classification Search
CPC .............................. H04N 7/144; H04N 7/142
USPC ............................................ 348/14.16, 14.01
See application file for complete search history.

(56) References Cited

U.S. PATENT DOCUMENTS

| | | | |
|---|---|---|---|
| 7,269,573 B1 | 9/2007 | Bunn et al. | |
| 8,199,108 B2 | 6/2012 | Bell | |
| 2004/0166484 A1 | 8/2004 | Budke et al. | |
| 2012/0206449 A1* | 8/2012 | Stark | 345/419 |
| 2013/0046594 A1 | 2/2013 | Davidson | |

* cited by examiner

*Primary Examiner* — Brent O'Hern
(74) *Attorney, Agent, or Firm* — Clements Bernard PLLC; Lawrence A. Baratta, Jr.; Christopher L. Bernard

(57) ABSTRACT

A virtual greeter system, a counter display system, and a method include systems and methods that provide simulated human interaction for placement in stores, libraries, hospitals, trade shows, kiosks, and the like. The virtual greeter system can include a projector housed in a tower; a screen attached or supported by a base coupled to the tower, the screen including projection film thereon, wherein the projector is positioned to display images of a person onto the projection film; a processor communicatively coupled to the projector, a network interface, a data store, input/output interfaces, and memory; and instructions that, when executed, cause the processor to: display video from the projector onto the screen, the video including a virtual person with hand, eye, and mouth movements; and provide audio coincident with the video from the virtual person.

16 Claims, 9 Drawing Sheets

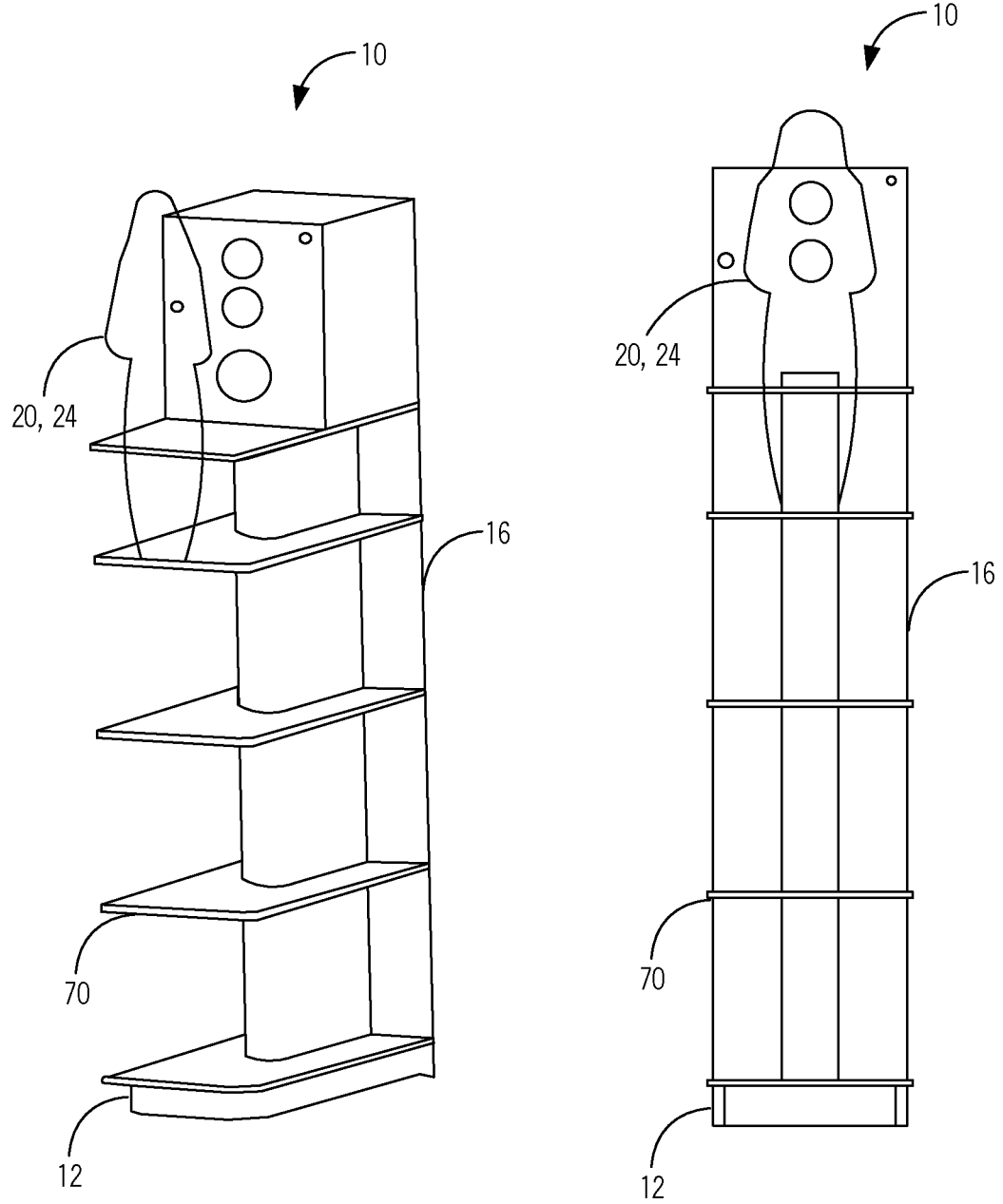

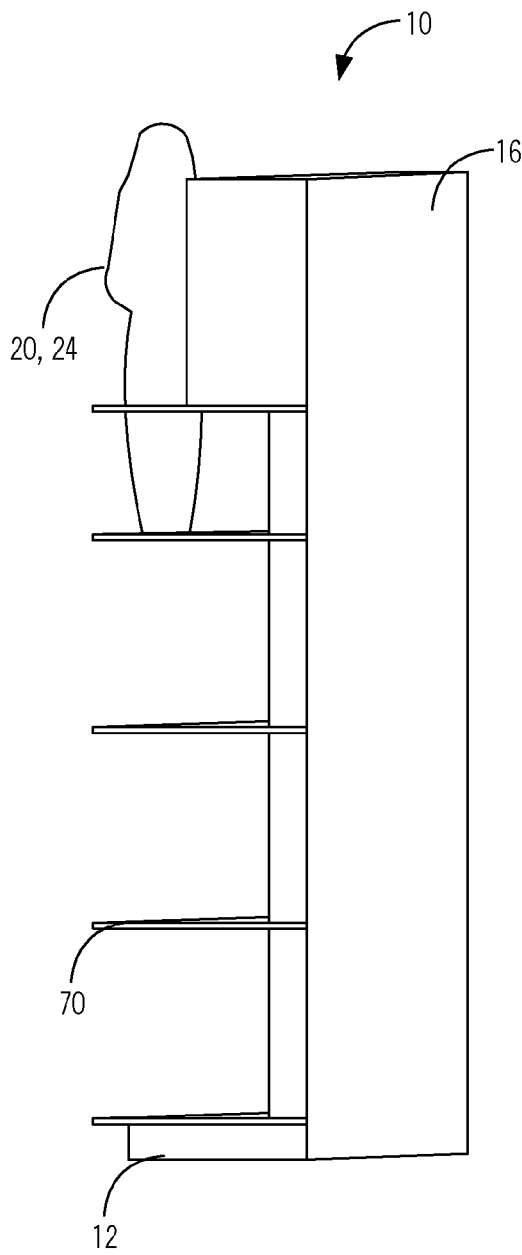
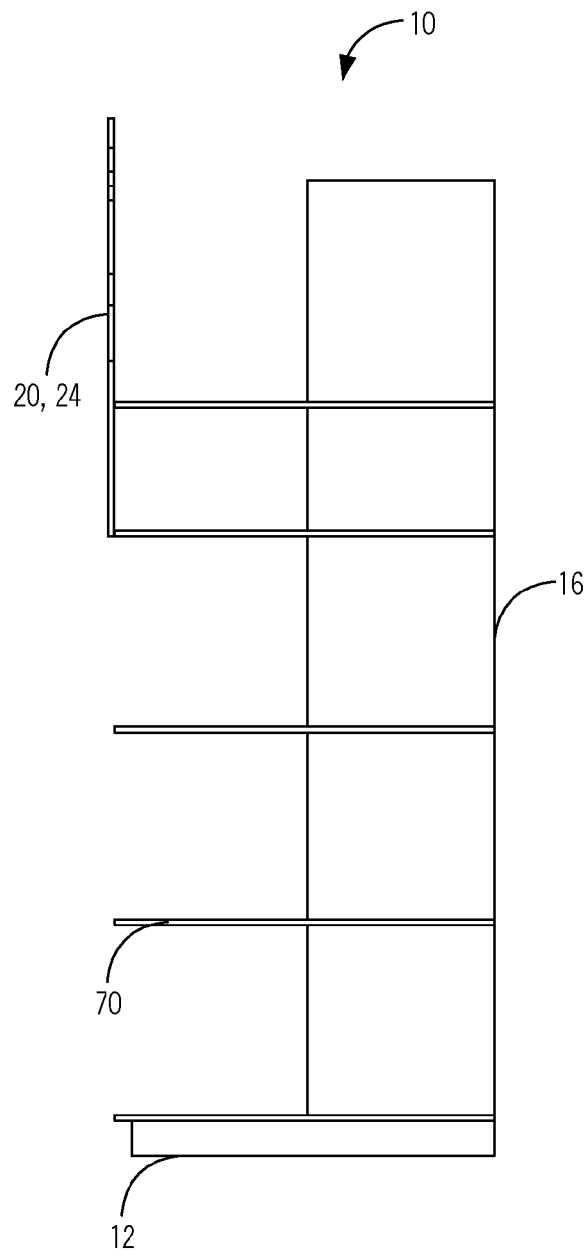
FIG. 7  FIG. 8

VIRTUALIZED GREETER SYSTEMS AND METHODS

CROSS-REFERENCE TO RELATED APPLICATION(S)

The present non-provisional patent application is a continuation-in-part of U.S. patent application Ser. No. 13/401,428 filed on Feb. 22, 2012 and entitled "SANITARY HANDLE COVER AND DISPENSER SYSTEMS AND METHODS," the contents of which are herein incorporated by reference in full.

FIELD OF THE DISCLOSURE

The present disclosure relates generally to virtual greeter. More particularly, the present disclosure relates to virtual greeter systems and methods that provide simulated human interaction for placement in stores, libraries, hospitals, trade shows, conventions, kiosks, and the like.

BACKGROUND OF THE DISCLOSURE

In various commercial situations and the like, employees are used for greeting shoppers, for providing in-store product information, for providing instructions, and the like. In other situations, e.g. hospitals, malls, etc., information desks can include employees to answer questions, provide directions, and the like. In yet other situations, e.g. conventions, trade shows, etc., personnel can be on hand to provide presentations, instructions, and information. Generally, it is believed the direct human interaction provides a more pleasant experience for shoppers, visitors, etc. Of note, the various situations require trained and knowledgeable personnel on hand to provide the various information to shoppers, visitors, etc.

BRIEF SUMMARY OF THE INVENTION

In various exemplary embodiments, the present disclosure relates to virtual greeter systems and methods that provide simulated human interaction for placement in stores, libraries, hospitals, trade shows, kiosks, and the like. The virtual greeter systems and methods can be referred to as a holographic or hologram system even though the technology used is not holographic, but rather image projection on a transparent projection film display as is described herein. The virtual greeter systems and methods can be used in various situations, includes interaction with a viewer, and various other features as our described herein.

In an exemplary embodiment, a virtual greeter system includes a projector housed in a tower; a screen attached or supported by a base coupled to the tower, the screen including projection film thereon, wherein the projector is positioned to display images of a person onto the projection film; a processor communicatively coupled to the projector, a network interface, a data store, input/output interfaces, and memory; and instructions that, when executed, cause the processor to: display video from the projector onto the screen, the video including a virtual person with hand, eye, and mouth movements; and provide audio coincident with the video from the virtual person. The projector can display the video on a rear side of the screen in an inverted fashion such that a front side of the screen appears as the virtual person in a correct orientation. The virtual greeter system can further include a proximity sensor communicatively coupled to the processor, wherein the instructions that, when executed, can further cause the processor to: detect a person in proximity of the tower based on the proximity sensor; initiate the video and the audio responsive to detecting the person; and conclude the video and the audio after a predetermined time period of not detecting a person by the proximity sensor. The instructions that, when executed, can further cause the processor to: receive video and audio data from the network interface or the input/output interfaces; store the video and audio data in the data store; and retrieve the video and audio data from the data store for display.

The instructions that, when executed, can further cause the processor to: generate video and audio data on-the-fly to provide a real-time dialogue with a visitor. The virtual greeter system can further include a fixed portion attached to the screen, wherein the fixed portion includes pants of the virtual person. The virtual greeter system can further include an audio output connected to the processor. The virtual greeter system can further include a vibrating speaker connected to the audio output, wherein the vibrating speaker is affixed to a glass window to create a talking window. The virtual greeter system can further include a scent creation module connected to the processor and configured to provide a selectable aroma proximate to the tower. The virtual greeter system can further include a counter module configured to detect and count visitors and amount of time at the tower. The virtual greeter system can further include a radio frequency identification module connected to the processor and configured to detect radio frequency identification tags. The virtual greeter system can further include a quick response code scanner or display connected to the processor and configured to provide quick response code interaction. The virtual greeter system can further include a near field communication module connected to the processor and configured to interact via near field communication with proximate devices. The virtual greeter system can further include a podium or counter between the screen and the base. The virtual greeter system can further include a touch screen connected to the processor for interaction with the virtual greeter system. The touch screen can be part of the screen such that it appears as if the virtual person is holding the touch screen. The virtual greeter system can further include a mounting configuration for the projector internal to the tower; and a vertical and horizontal adjustment mechanism for the mounting configuration.

In another exemplary embodiment, a counter display system includes a base; a counter disposed on the base; a screen connected to the counter; a tower facing the screen; a projector internal to the tower and projecting a virtual person onto a rear portion of the screen; a processor communicatively coupled to the projector, a network interface, a data store, input/output interfaces, and memory; and instructions that, when executed, cause the processor to: display video from the projector onto the screen, the video including a virtual person with hand, eye, and mouth movements; and provide audio coincident with the video from the virtual person. In yet another exemplary embodiment, a method includes receiving video and audio data by a virtual greeter system; projecting video from the video and audio data onto a projection film display, wherein the video includes a person forming a virtual greeter; playing audio coincident with the video, wherein the audio includes the virtual greeter speaking; responsive to not detecting a visitor for a predetermined time period, concluding the video and the audio; responsive to detecting a visitor, resuming the video and the audio; and tracking a number of visitors and duration of viewing of each.

BRIEF DESCRIPTION OF THE DRAWINGS

The present disclosure is illustrated and described herein with reference to the various drawings of exemplary embodiments, in which like reference numbers denote like method steps and/or system components, respectively, and in which:

FIGS. 5-8 are schematic diagram of yet another exemplary implementation of the virtual display system of FIGS. 1 and 2;

DETAILED DESCRIPTION OF THE DISCLOSURE

Again, in various exemplary embodiments, the present disclosure relates to virtual greeter systems and methods that provide simulated human interaction for placement in stores, libraries, hospitals, trade shows, kiosks, and the like. The virtual greeter systems and methods can be referred to as a holographic or hologram system even though the technology used is not holographic, but rather image projection on a transparent projection film display as is described herein. The virtual greeter systems and methods can be used in various situations, includes interaction with a viewer, and various other features as our described herein.

Figure 1:
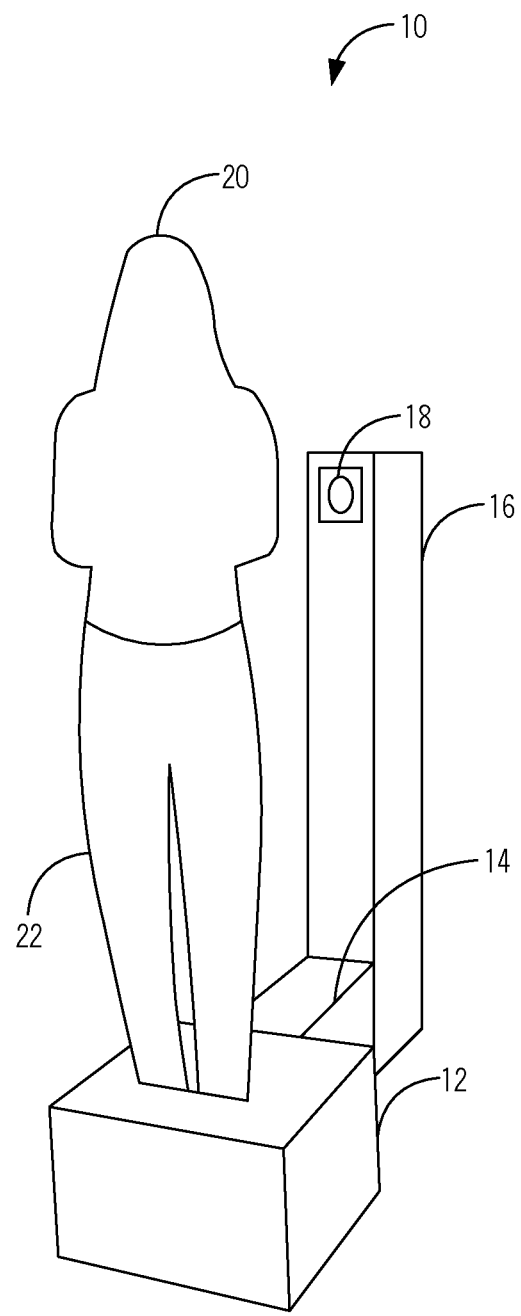
FIG. 1 is a schematic diagram of a virtual display system for use with the virtual greeter systems and methods.

Referring to FIG. 1, in an exemplary embodiment, a schematic diagram illustrates a virtual display system 10. The virtual display system 10 may be referred to as a holographic greeter, a virtual greeter, a virtual concierge, etc. The virtual display system 10 includes a base 12, a base connection portion 14, a tower 16, a projector 18, a screen 20, and a fixed screen 22. The base 12 sits on a floor or other surface and supports the fixed screen 22 and the screen 20. The tower 16 is connected to the base 12 via the base connection portion 14. The tower 16 houses the projector 18 in an elevated configuration. The projector 18 is configured to display images on the screen 20. The fixed screen 22 includes a fixed, non-animated portion of a person. That is, the person is a virtualized greeter and the fixed screen 22 is a painted or printed of the person. For example, the fixed screen 22 may include pants. The screen 20 may include an acrylic, transparent screen cut out in the size and shape of a top half of the person. The projector 18 is configured to project images onto the screen 20 providing a user standing in front of the virtual display system 10 a virtualized greeter with voice and facial movements. For example, a sound system may be disposed within the tower 16 for sound to accompany the images from the projector 18.

The virtual display system 10 is an exciting information, branding and promotional messaging medium which displays a holographic image projected onto a life-sized cut-out that is so unique and lifelike; consumers and visitors cannot help but stop and stare. Advertisers can deliver their message or introduce new products to a receptive audience without intimidation. The inclusion of Advanced Next Generation QR Codes in the message allows smart phone users to further engage themselves in the Advertiser's message. By using simple color coded QR Codes, the Greeter can convey any message . . . from simple contact information, reservations or directions, to in-depth web based interaction, such as discounts or special offers, further enticing patrons. This may also include Blue QR Codes which serve as interactive survey codes that the end user can scan and link directly to online customer satisfaction surveys that when completed by the end user will provide direct feedback on products, services, etc. The Surveyor can/will automatically generate coupons for discounts on future purchases as a courtesy for completion of the survey and these coupons will be emailed directly to the survey taker.

The virtual display system 10 can be positioned virtually anywhere and is a high-tech communications platform that serves up in-store information, directions, personal greetings and/or branding impressions in a decidedly unique fashion. The key to branding is in unique impressions. The virtual display system 10 may be used with Retailers, Museums, Hotels, Attractions, Mass Transit, Schools, Hospitals, Trade Expos, Doctors, and Offices. The virtual display system 10 may be considered an employee who delivers messages 24 hours a day, seven days a week with no breaks.

In addition to the virtual display system 10 incorporating AromaFusion into the Greeter's message, the virtual display system 10 can engage memory and emotions through a scent delivery system, creating a total immersion experience for retailers, advertisers and patrons. It has been well documented that smell can have a halo effect and put Shoppers in a positive mood, which affects their perception of a product or their environment. The sense of smell goes straight into the limbic system in the brain, which is responsible for emotions and decision-making Brand memory and increased attention and interaction are directly influenced by this powerful emotional motivator. By engaging the Customer with the compelling image of the virtual display system 10, then further immersing them on a cognitive level with a fragrance, the virtual display system 10 can create an ingrained branding experience not soon forgotten. When placed at the entry of the store, it will create a lasting first impression and will be the last thing they smell and remember when leaving.

In an exemplary embodiment, the virtual display system 10 can support 360 degree visibility through a film combination on the screen 20. This can support users at varying lines of site viewing the virtual display system 10. The virtual display system 10 can also be a close-up projection system meaning the projector 18 is close to the screen 20. Further, the virtual display system 10 can be interactive with touch screen capabilities, such as built into the screen 20 or another device near or on the screen 20. The virtual display system 10 can also include laser targeting capabilities. A touchscreen on the screen 20 can be implemented in various different manners. As a single touchscreen on a side of the electronics tower 16 or as dual touchscreen on both sides of the electronics tower 16 or lastly as a touchscreen mounted on a stanchion pole in front of the lexan (or similar) silhouette, i.e. the screen 20.

Figure 2:
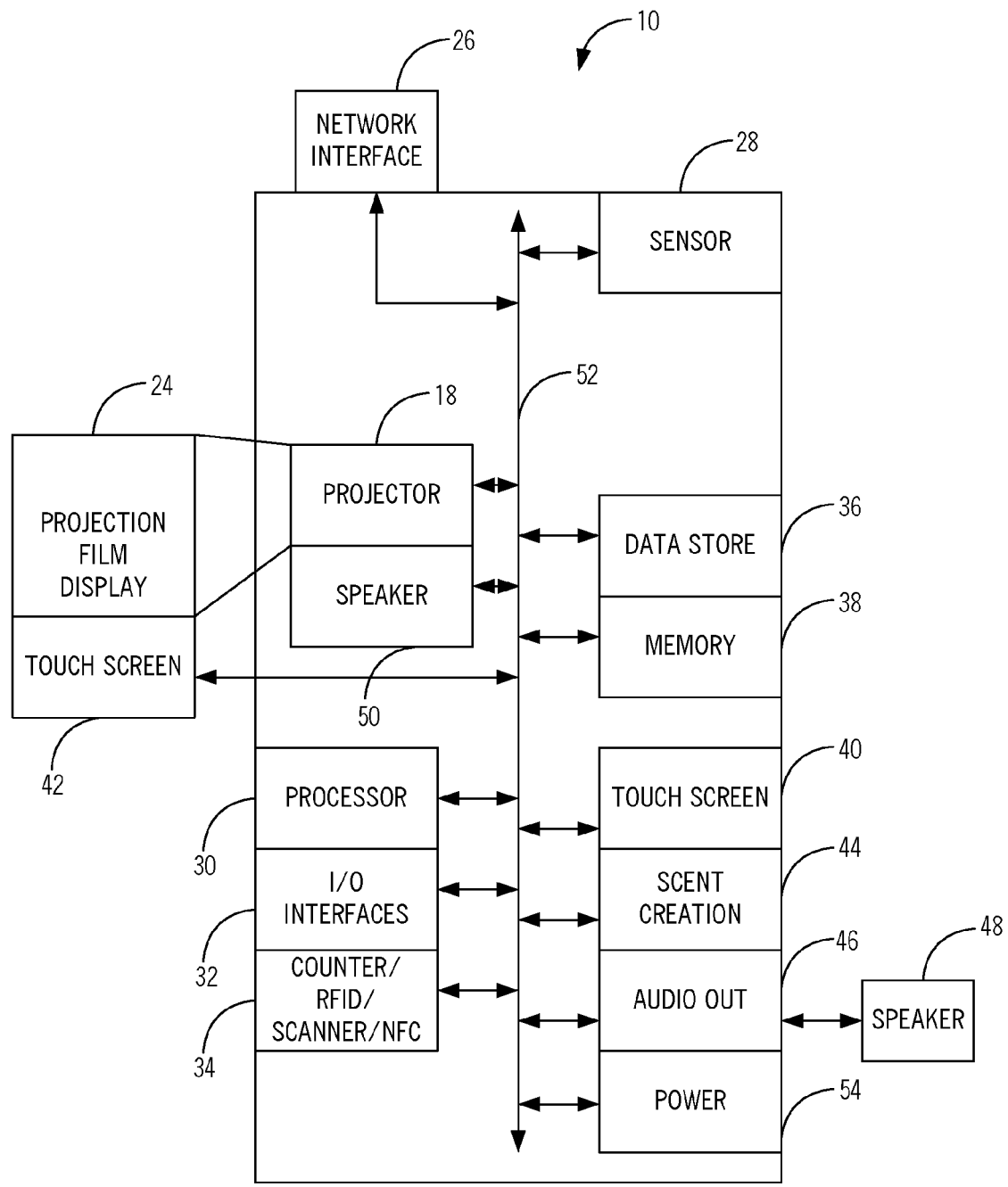
FIG. 2 is a block diagram of various functional components of the virtual display system of FIG. 1.

Referring to FIG. 2, in an exemplary embodiment, a block diagram illustrates various functional components of the virtual display system 10. The functional components of the virtual display system 10 can include, without limitation, the projector 18, a projection film display 24, a network interface 26, a sensor 28, a processor 30, input/output (I/O) interfaces 32, a counter/Radio Frequency Identification (RFID)/scanner/Near Field Communications (NFC) module 34, a data store 36, memory 38, a first touch screen 40, a second touch screen 42, a scent creation module 44, an audio output 46, an external speaker 48, an internal speaker 50, and a local communications interface 52. The processor 30, I/O interfaces 32, data store 36, memory 38, and network interface 26 can be integrated in a server or the like included in the virtual display system 10. It should be appreciated by those of ordinary skill in the art that FIG. 2 depicts the virtual display system 10 in an oversimplified manner, and a practical embodiment may include additional components and suitably configured processing logic to support known or conventional operating features that are not described in detail herein. The components of the virtual display system 10 are communicatively coupled via the local communications interface 52. The local communications interface 52 may be, for example but not limited to, one or more buses or other wired or wireless connections, as is known in the art. The local communications interface 52 may have additional elements, which are omitted for simplicity, such as controllers, buffers (caches), drivers, repeaters, and receivers, among many others, to enable communications. Further, the local communications interface 52 may include address, control, and/or data connections to enable appropriate communications among the aforementioned components.

The processor 30 is a hardware device for executing software instructions. The processor 30 may be any custom made or commercially available processor, a central processing unit (CPU), an auxiliary processor among several processors associated with the virtual display system 10, a semiconductor-based microprocessor (in the form of a microchip or chip set), or generally any device for executing software instructions. When the virtual display system 10 is in operation, the processor 30 is configured to execute software stored within the memory 38 and/or data store 36, to communicate data to and from the memory 38 and/or data store 36, and to generally control operations of the virtual display system 10 pursuant to the software instructions. The general operations of the virtual display system 10 can include displaying images stored in the memory 38 and/or data store 36 on the projection film display 24 from the projector 18 as well as various other additional functionality associated with other functional components illustrated in FIG. 3 of the virtual display system 10.

The I/O interfaces 32 may be used to receive user input from and/or for providing system output to one or more devices or components. User input may be provided via, for example, a keyboard, touch pad, and/or a mouse as well as the touch screens 40, 42. System output may be provided via a display device and a printer (not shown). The I/O interfaces 32 may include, for example, a serial port, a parallel port, a small computer system interface (SCSI), a serial ATA (SATA), fibre channel, Infiniband, iSCSI, a PCI Express interface (PCI-x), an infrared (IR) interface, a radio frequency (RF) interface, a universal serial bus (USB) interface as well as wireless USB variants, and/or any proprietary or custom communications interfaces.

The network interface 26 may be used to enable the virtual display system 10 to communicate on a network, such as the Internet, a local area network (LAN), a wireless LAN (WLAN), a cellular network, a virtual private network (VPN), an enterprise network, and a combination thereof. For example, the network interface 26 can be used to upload content to the virtual display system 10 as well as received data from the virtual display system 10 related to the other functional components described herein. In an exemplary embodiment, the network interface 26 may be communicatively coupled to a management system that provides content delivery and overall monitoring of operation of the virtual display system 10. The network interface 26 may include, for example, an Ethernet card or adapter (e.g., 10BaseT, Fast Ethernet, Gigabit Ethernet, 10GbE), a wireless local area network (WLAN) card or adapter (e.g., IEEE 802.11a/b/g/n/ac, WiMAX, etc.), a broadband cellular adapter (3G/4G/LTE/etc.), and the like. The network interface 26 may include address, control, and/or data connections to enable appropriate communications on the network.

The data store 36 may be used to store data. The data store 36 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 36 may incorporate electronic, magnetic, optical, and/or other types of storage media. In one example, the data store 36 may be located internal to the virtual display system 10 such as, for example, an internal hard drive connected to the local communications interface 52. Additionally in another embodiment, the data store 36 may be located external to the virtual display system 10 such as, for example, an external hard drive connected to the I/O interfaces 32 (e.g., SCSI or USB connection). In a further embodiment, the data store 36 may be connected to the virtual display system 10 through a network, such as, for example, a network attached file server. The data store 36 can include audio and video content for display via the virtual display system 10.

The memory 38 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 38 may incorporate electronic, magnetic, optical, and/or other types of storage media. Note that the memory 38 may have a distributed architecture, where various components are situated remotely from one another, but can be accessed by the processor 30. The software in memory 38 may include one or more software programs, each of which includes an ordered listing of executable instructions for implementing logical functions. The software in the memory 38 includes a suitable operating system (O/S) and one or more programs. The operating system essentially controls the execution of other computer programs, such as the one or more programs, and provides scheduling, input-output control, file and data management, memory management, and communication control and related services. The operating system may be any of Microsoft Windows and variants thereof (Windows NT, Windows 2000, Windows XP, Windows Vista, Windows 7, Windows 8, Windows Server 2003/2008/2011) (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), Apple OS X and variants thereof (available from Apple, Inc. of Cupertino, Calif.), or the like. The one or more programs may be configured to implement the various processes, algorithms, methods, techniques, etc. described herein.

The projector 18 is an image projector that receives a video signal and projects the corresponding image on the projection film display 24 using a lens system. The projector 18 uses a very bright light to project the image, and can correct any curves, blurriness, and other inconsistencies through manual settings. The projector 18 can include a commercial projector used for many applications such as, conference room presentations, classroom training, home theatre and concerts. Importantly, the projector 18 has to have a short projection range since the projection film display 24 is located several inches away from the projector 18. The projector 18 can include a cathode ray tube (CRT) projector, a liquid crystal display (LCD) projector, a digital light processing (DLP) projector, a liquid crystal on silicon (LCoS) projector, a light emitting diode (LED) projector, or the like. The projector 18 is communicatively coupled to the local communications interface 52 and can be controlled by the processor 30 and receive video data from the data store 36. The projector 18 is housed internally in the tower 16. In an exemplary embodiment, the projector 18 is immobilized inside the tower 16, but can include a minor adjustment mechanism to allow alignment of an image onto the projection film display 24. The projector 18 can include full, 360 degree HD image technology that creates a dynamic range of view that is unrestricted, bright, crisp and visible from a full 360° . . . the widest viewing field available The projection film display 24 can be attached to the screen 20. The projection film display 24 is operable to receive images on a rear side from the projector 18 and display the images on a front side. The images are viewable both on the rear and front sides of the projection film display 24, but appear inverted on the rear side. In an exemplary embodiment, the projection film display 24 can include polycarbonate, Lexan, Makrolon, Makroclear, 3G Switchable Film, and others. In another exemplary embodiment, the projection film display 24 can include Vikuiti™ Rear Projection Film (RPF) available from 3M which is a flexible, self-adhesive film that can be applied to windows or transparent partition to provide crisp, brilliant images in high ambient light areas and from any viewing angle. RPF is easily cut to shape and size, is fast and easy to remove, and can be integrated with other window graphics.

The sensor 28 is configured to detect people in proximity to the virtual display system 10. For example, if no one is in the vicinity of the virtual display system 10 for a predetermined time, the virtual display system 10 can turn off or go in a standby mode. The sensor 28 can be a proximity sensor that detects movement and people. The proximity sensor emits an electromagnetic field or a beam of electromagnetic radiation (infrared, for instance), and looks for changes in the field or return signal. The object being sensed is often referred to as the proximity sensor's target. In addition to controlling power to the virtual display system 10, the sensor 28 can also track the number and times people view the virtual display system 10. Such information is useful to track effectiveness of the virtual display system 10. The sensor 28 can also be a motion activated automatic on-board ambient audio sensor that electronically monitors and adjusts preset system volume levels, ensuring the message is always delivered at the proper level even during periods of high noise.

In addition to the sensor 28, the counter/RFID/scanner/NFC module 34 can provide various additional sensor and I/O functionality. First, the module 34 can include a counter which tracks time and number of visits to the virtual display system 10. The counter can also monitor duration of each visit. Again, this data is useful in determining effectiveness of the virtual display system 10. The module 34 can include RFID functionality which can be used to provide product information (e.g., based on products the consumer has or is interested in) as well as loss prevention (e.g., when the virtual display system 10 is display at an ingress/egress point). The module 34 can also include a scanner and/or a QR code display. The scanner can be used to scan information such as to provide product or service information. The scanner can also be used at trade shows, conventions, etc. to take visitor information such as from their ID badge. The QR code display can be used to provide QR codes to visitors such as via the projector 18, the touch screens 40, 42, etc. The QR code display can provide detailed QR tracking capabilities allowing Retailers to interact with Surveys, Promotions and web links and actively track and manage campaign results in "real time." The module 34 can also include a NFC communication module which can communicate to a visitor's smart device (e.g., smart phone, tablet, etc.).

The virtual display system 10 can include one or more touch screens 40, 42 for receiving user input. For example, the touch screen 40 can be located on the tower 16 and the touch screen 42 can be located at or near the screen 20. Of course, the virtual display system 10 could include touch screens in other areas. The touch screens 40, 42 can provide a graphical user interface (GUI) for providing input to the virtual display system 10. This input can be from a visitor and/or an operator. The touch screens 40, 42 can also provide output as well. The touch screens 40, 42 can interactively handle tasks as simple as giving directional guidance or information to dispensing coupons for discounts, all the way to in-depth database interaction or complete Client Relationship Management with registrations, surveys, exit polls, etc.

The virtual display system 10 can also include a scent creation module 44. The scent creation module 44 is configured to emit an aroma to augment user experience with the virtual display system 10. For example, when used to promote foods, the scent creation module 44 can emit scents associated with the foods. Alternatively, the scent creation module 44 can emit refreshing scents or the like to provide a more comforting experience. The scent creation module 44 is a scent delivery system creating a total immersion experience by incorporating the sense of almost any smell, further engaging and compelling interaction.

The virtual display system 10 can include an audio output 46 that can connect to external speakers and the like. In an exemplary embodiment, the virtual display system 10 can provide a "speaking glass" configuration where the audio output 46 connects to a speaker 48 that is place on a window or the like to vibrate the window such that it provides sound from the window. This configuration is useful in a store or the like where the virtual display system 10 is located near a window. For example, the speaker 48 can be a window transducer that allows a message to be heard directly through storefront glass by turning the storefront glass into a speaker, eliminating the need for extensive and expensive outdoor wiring. The virtual display system 10 also includes the speaker 50 which is configured to provide audio concurrent with the video from the projector 18. In this manner, the virtual display system 10 can display a virtual person that can engage via video and audio with visitors. Also, the virtual display system 10 can include a noise monitor which can monitor ambient noise and adjust volume on the speakers 48, 50 accordingly.

Finally, the virtual display system 10 can include a power module 54 which can be a combination of AC power to a wall socket, a rectifier, and/or battery backup in case of power loss. Additionally, the virtual display system 10 can utilize alternate methods of power so the virtual display system 10 can be remotely positioned without having an active electrical source. For example, an exemplary embodiment can combine 12v Deep cycle batteries combined in series (or parallel depending on application) combined with either an Inverter or a Uninterruptable Power Supply (UPS), which can provide up to 24 hours of runtime (depending on configuration) without being plugged into an electrical source. For a Battery/Inverter/Charger exemplary embodiment, 12v deep cycle batteries (1-4 batteries (or more) depending on run time desired) are wired in parallel and coupled with a 12v to 110v inverter/charger that supplies power to all of the electrical components of the virtual display system 10. There can be a switchable multi-bank charger incorporated for quick charge capabilities so a full charge can be restored in as little as 5 hours. For a Battery/UPS exemplary embodiment, 12 v deep cycle batteries (1-4 batteries (or more) depending on run time desired) are wired in series and coupled to an Uninterruptable Power Supply (UPS).

Figure 3:
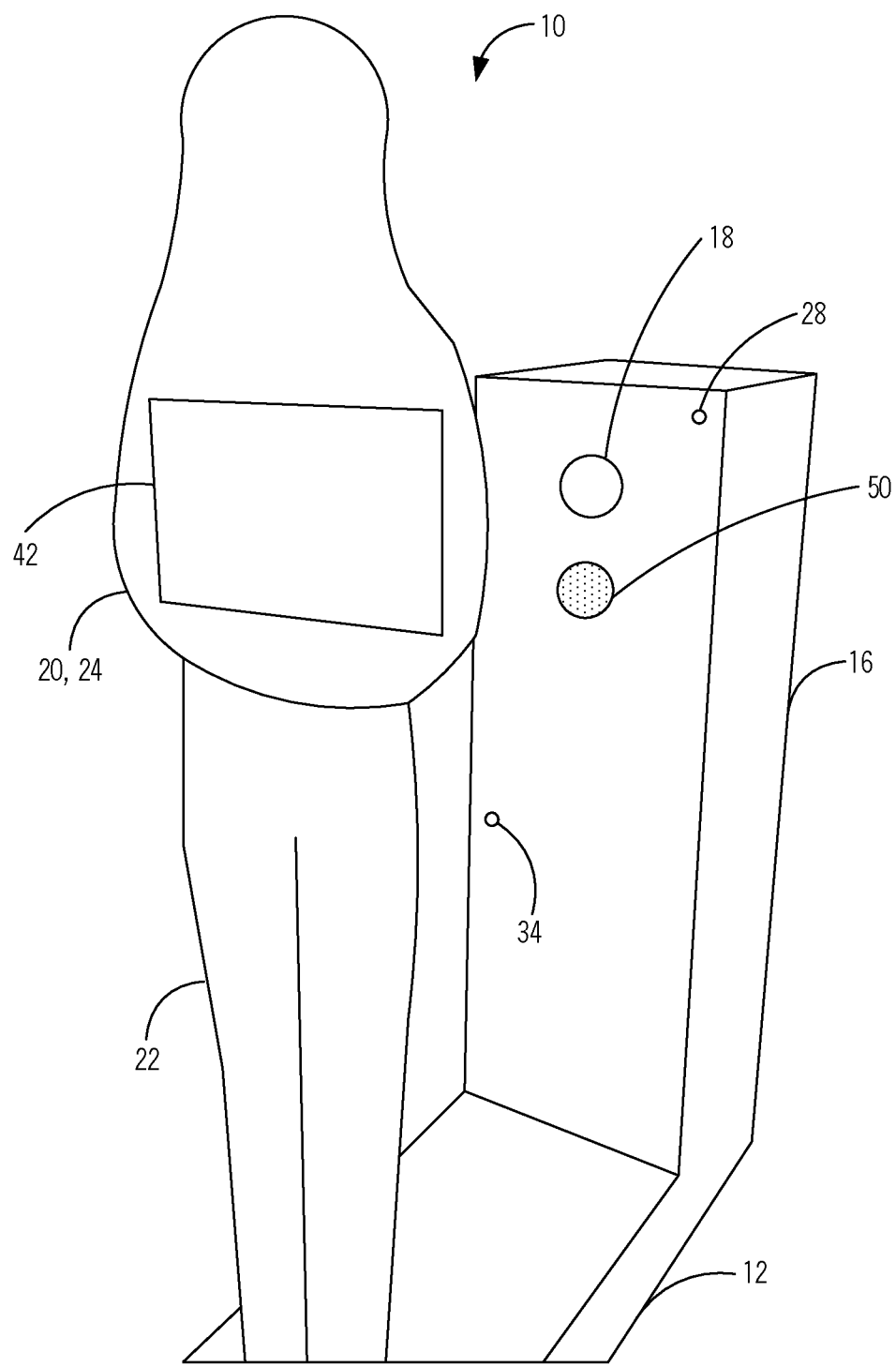
FIG. 3 is a schematic diagrams of an exemplary implementation of the virtual display system of FIGS. 1 and 2.

Referring to FIG. 3, in an exemplary embodiment, a schematic diagrams illustrates an exemplary implementation of the virtual display system 10. FIG. 3 illustrates possible locations on the tower 16 for the projector 18, the sensor 28, the module 34, and the speaker 50. Additionally, the touch screen 42 is disposed in the screen 20 such that the virtual person appearing on the projection film display 24 appears to hold the touch screen 42. This can be referred to as video-in-video which is similar to picture-in-picture on televisions where the virtual greeter appears to hold a video screen, i.e. the touch screen 42, for incorporating streaming video and/or presentation slides into the messaging. In operation, video is made beforehand for display on the projection film display 24 by the projector. Alternatively, the video can be generated on-the-fly. The tower 16, the base 12, etc. can also display logos or messaging. For example, a store's logo can be printed on the tower 16.

The virtual display system 10 contemplates two modes of video—prerecorded and on-the-fly. The prerecorded video can be produced in front of a green or blue screen with the person wearing a uniform or the like. The video can include a multitude of topics such that a visitor can engage in a dialogue with the virtual display system 10. In the prerecorded video, a presenter can read various scripts and the associated video and audio can be provided to the virtual display system 10 such as via the network interface 26, the I/O interfaces 32, etc. Further, it is anticipated that the video can actually be generated on-the-fly to simulate a person and movement as a dialogue occurs between a visitor and the virtual display system 10. Here, the data store 36 can include various pieces that are combined in real-time to simulate a person along with corresponding audio. In this exemplary embodiment, a visitor can have a unique conversation with the virtual display system 10. For example, the virtual display system 10 can also include a microphone which converts speech from a visitor in computer-readable data for processing and responses thereto.

Figure 4:
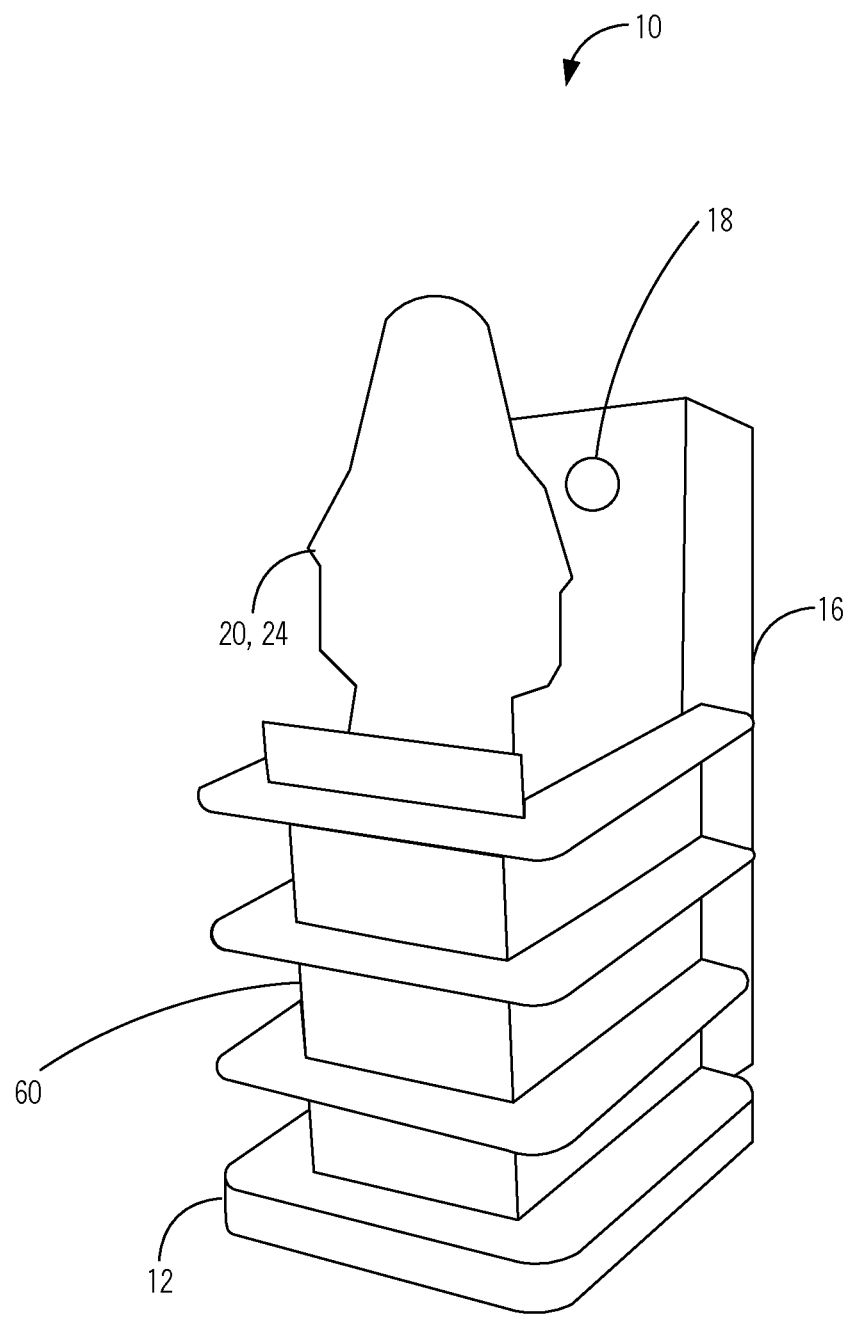
FIG. 4 is a schematic diagrams of another exemplary implementation of the virtual display system of FIGS. 1 and 2.

Referring to FIG. 4, in an exemplary embodiment, a schematic diagrams illustrates another exemplary implementation of the virtual display system 10. FIG. 4 illustrates the virtual display system 10 with a podium 60 coupled to the base 12 and the screen 20 making it appear as if the virtual person is behind the podium 60. The podium 60 can also be a desk, counter, kiosk, etc. Of note, the virtual display system 10 of FIGS. 1, 3, and 4 illustrate the virtual person on the screen 20 in about life-sized proportions.

Referring to FIGS. 5-8, in an exemplary embodiment, schematic diagrams illustrate yet another exemplary implementation of the virtual display system 10. In particular, the exemplary implementation of FIGS. 5-8 includes a smaller sized screen 20 (relative to FIGS. 1, 3, and 4) with the screen 20 located in an elevated position such as about eye level of an adult visitor. FIG. 5 is a side perspective view, FIG. 6 is a front view, FIG. 7 is rear perspective view, and FIG. 8 is a side view. The exemplary implementation of FIGS. 5-8 includes a podium 70 which can include shelves and the like for display, information, etc. The screen 20 can be positioned on one of the shelves of the podium 70. The podium 70 can be a wrap-around gondola/shelf unit for point-of-presence merchandising which modularly docks to the virtual display system 10 to bring products directly into the sales cycle.

Figure 9:
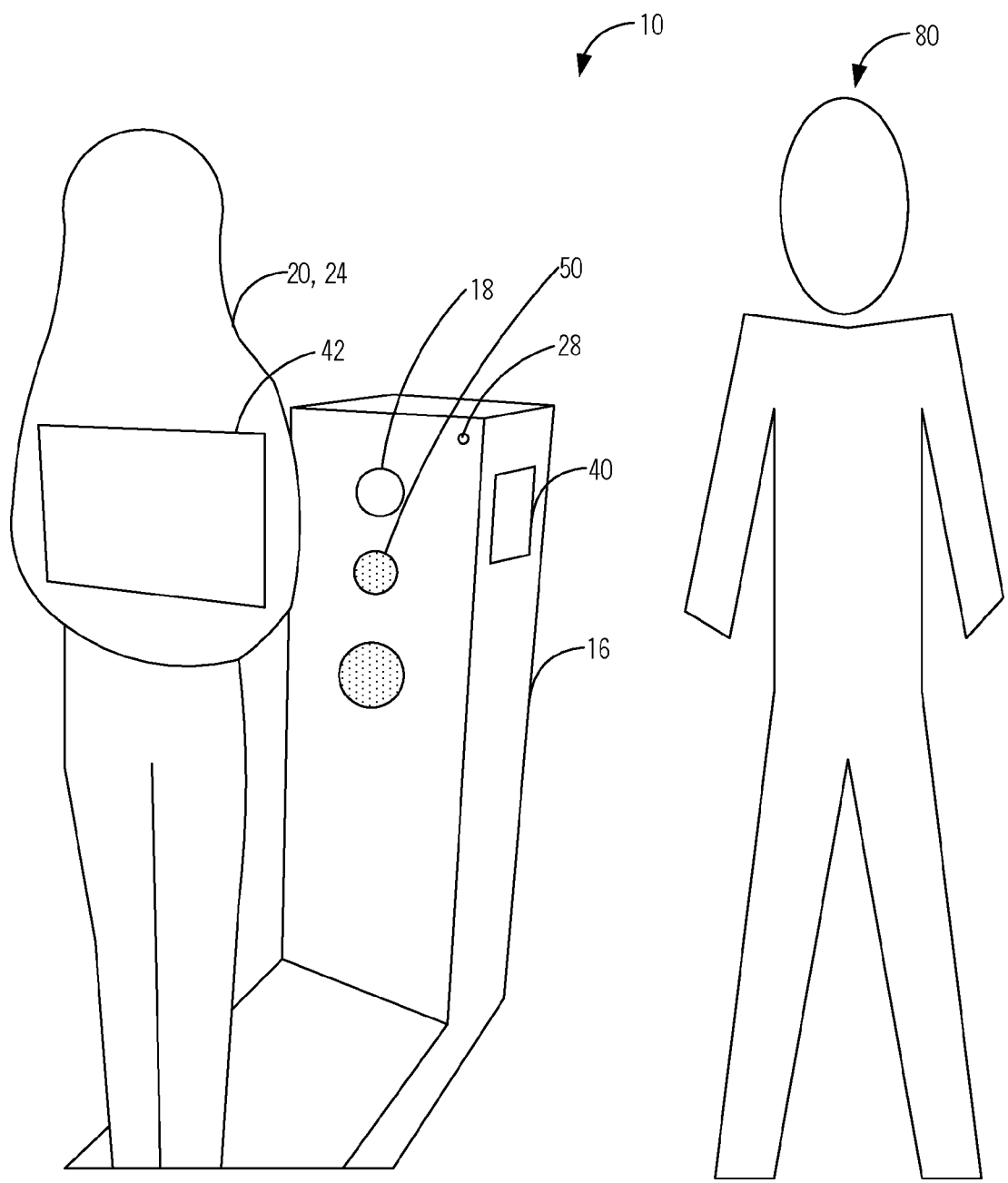
FIG. 9 is a schematic diagram of the exemplary implementation of the virtual display system of FIG. 3 with a touch screen.

Referring to FIG. 9, in an exemplary embodiment, a schematic diagram illustrates the exemplary implementation of the virtual display system 10 of FIG. 3 with the touch screen 40 included in the tower 16. Here, a visitor 80 is shown in proximity of the virtual display system 10 and is detected by the sensor 28 causing the projector 18 and the speaker 50 to operate. Also, the visitor 80 can interact with the virtual display system 10 via the touch screen 40, 42 or via voice commands.

Each of the exemplary implementations of the virtual display system 10 can include wheels, rollers, or the like on the bottom of the base 12 for maneuvering and positioning of the virtual display system 10. Also, the wheels, rollers, or the like can include brakes which inhibit movement once the virtual display system 10 is positioned properly. In an exemplary embodiment, the screen can be anywhere from 10" to 70" tall. For example, to simulate a life-sized person, the screen may be 69" tall.

In an exemplary embodiment, one or more of the virtual display systems 10 are communicatively coupled to a cloud-based content management system. The cloud-based content management system allows wireless updates from remote locations allowing programming to get up and running faster, with improved manageability and less maintenance. The cloud-based content management system can also monitor usage via the sensors 28, the modules 34, etc.

Figure 10:
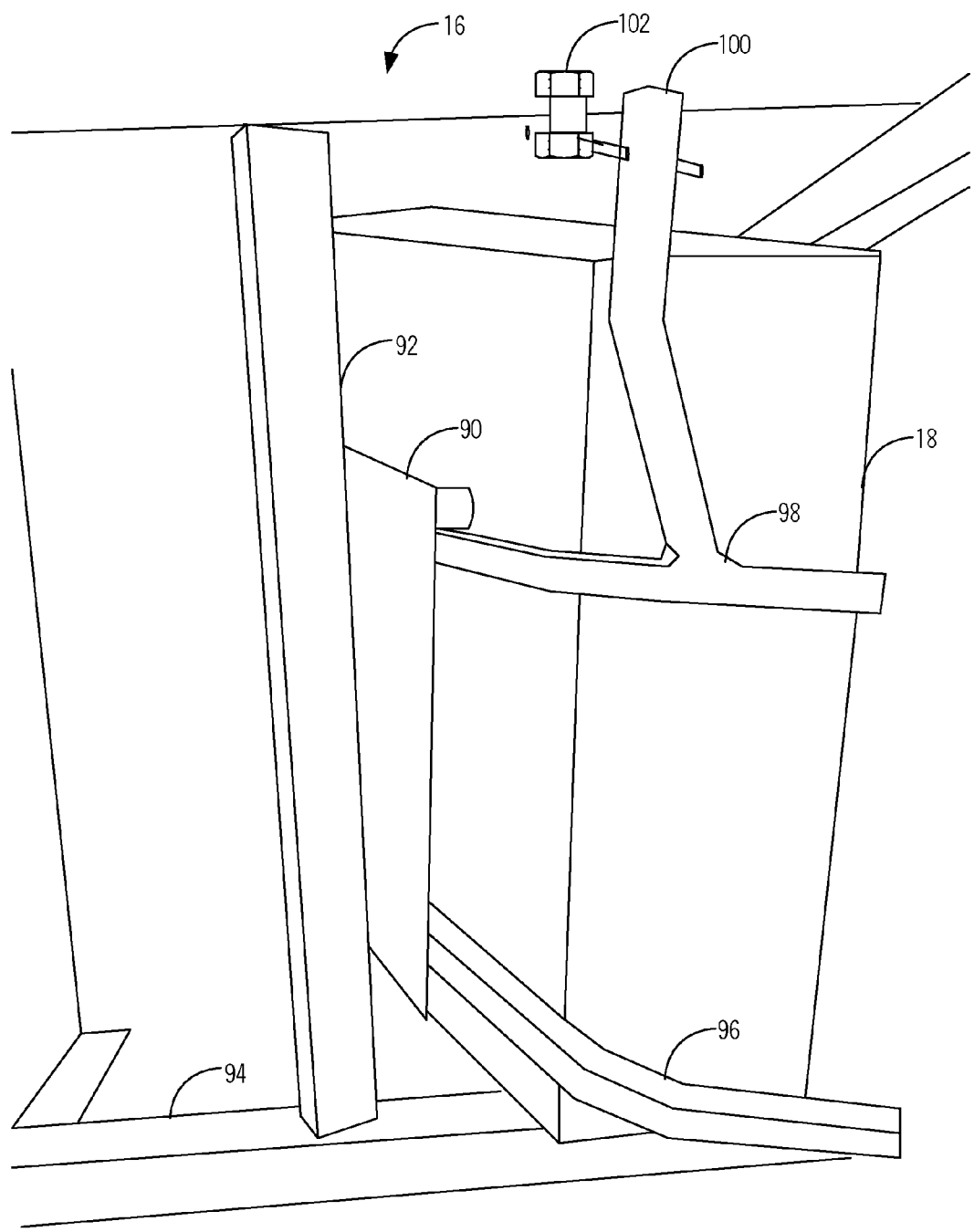
FIG. 10 is a schematic diagram illustrates an interior portion of a tower of the virtual display system of FIGS. 1-9 showing a mounting configuration for the projector.

Referring to FIG. 10, in an exemplary embodiment, a schematic diagram illustrates an interior portion of the tower 16 showing a mounting configuration for the projector 18. Of note, the various components in FIG. 2 of the virtual display system 10 can be housed by the tower 16 and/or base 12. The projector 18 must be housed in the tower 18 at a about a same level as the screen 20. The components must be fixed, bracketed, or attached to internal walls or brackets in the tower 16 and/or base 12. Importantly, during transport or movement of the virtual display system 10, the projector 18 must remain substantially immobilized. However, there may still be a need for minor tweaks and position adjustments. The mounting configuration includes a bracket 90 that connects to the projector 18. The bracket 90 is mounted internally to the tower 16 via various arms 92, 94, 96, 98. The arms 92, 94 can be mounted to the tower 16, the arm 92 can be mounted to the bracket 90, and the arms 96, 98 can be mounted to the bracket 90 and provide support for the projector 16. The arm 98 can have an extension 100 that connects to a jig 102 that extends out of the tower 16. A screwdriver or Allen wrench can be used to move the jig 102 for adjustments to the projector 18 position. For example, the mounting configuration via the jig 102 can support slight movements of the projector in a vertical and a horizontal position, e.g. no more than 2 inches in either direction. This can be used to tweak the projector 18 position on the screen 22.

Figure 11:
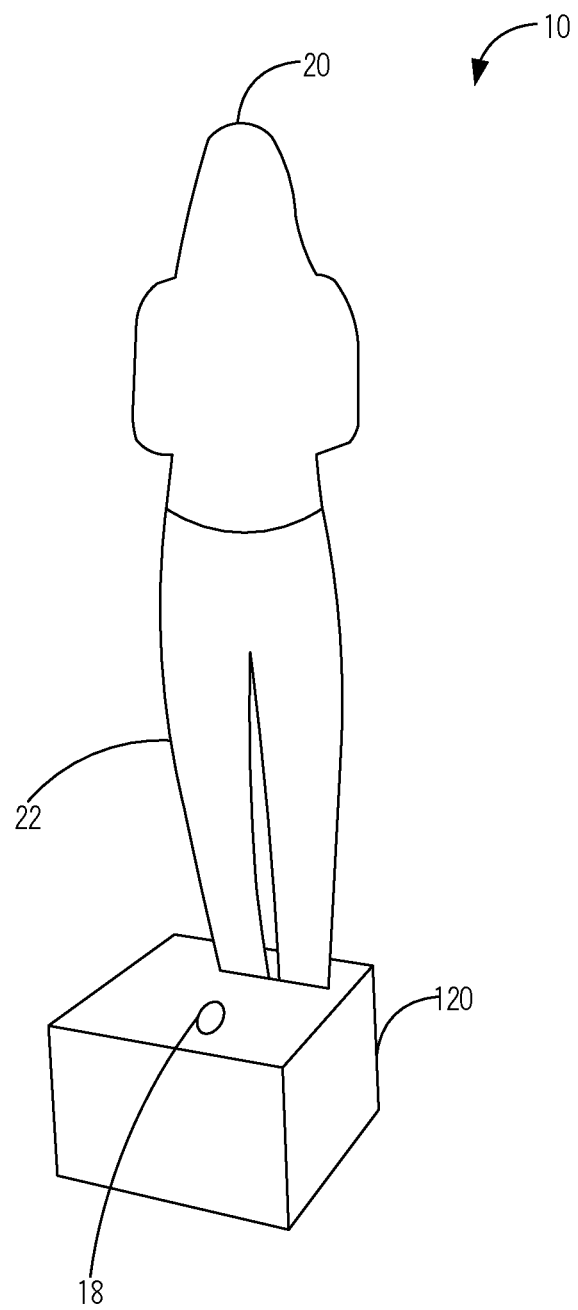
FIG. 11 is a schematic diagrams illustrates another exemplary implementation of the virtual display system.

Referring to FIG. 11, in an exemplary embodiment, a schematic diagrams illustrates another exemplary implementation of the virtual display system 10. In FIG. 11, the virtual display system 10 includes a fixed base 120 of variable dimensions. The fixed base 120 includes all of the aforementioned components of the virtual display system 10 in a single housing. A silhouette can be positioned on the fixed base 120 in a center or rear part with the silhouette formed by the screen 20 and the fixed portion 22 or the like. The screen 20 can be coated on a front or rear portion of the virtual display system 10, i.e. cut to the outline shape of a silhouette of the virtual greeter, with a LCD display. Also, the virtual display greeter 10 can include an exemplary embodiment where the LCD film cut to the outline shape of the silhouette is sandwiched between 2

Lexan or similar panels. The projector 18 can be located within the fixed base 120 and projected at an angle onto the screen 20.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A virtual greeter system, comprising:
   a projector housed in a tower;
   a screen attached or supported by a base coupled to the tower, the screen comprising projection film thereon, wherein the projector is positioned to display images of a person onto the projection film;
   a processor communicatively coupled to the projector, a network interface, a data store, input/output interfaces, and memory;
   instructions that, when executed, cause the processor to:
      display video from the projector onto the screen, the video comprising a virtual person with hand, eye, and mouth movements; and
      provide audio coincident with the video from the virtual person; and
   an audio output connected to the processor and a vibrating speaker connected to the audio output, wherein the vibrating speaker is affixed to a glass window to create a talking window.

2. The virtual greeter system of claim 1, wherein the projector displays the video on a rear side of the screen in an inverted fashion such that a front side of the screen appears as the virtual person in a correct orientation.

3. The virtual greeter system of claim 1, further comprising:
   a proximity sensor communicatively coupled to the processor, wherein the instructions that, when executed, further cause the processor to:
   detect a person in proximity of the tower based on the proximity sensor;
   initiate the video and the audio responsive to detecting the person; and
   conclude the video and the audio after a predetermined time period of not detecting a person by the proximity sensor.

4. The virtual greeter system of claim 1, wherein the instructions that, when executed, further cause the processor to:
   receive video and audio data from the network interface or the input/output interfaces;
   store the video and audio data in the data store; and
   retrieve the video and audio data from the data store for display.

5. The virtual greeter system of claim 1, wherein the instructions that, when executed, further cause the processor to:
   generate video and audio data on-the-fly to provide a real-time dialogue with a visitor.

6. The virtual greeter system of claim 1, further comprising:
   a fixed portion attached to the screen, wherein the fixed portion comprise pants of the virtual person.

7. The virtual greeter system of claim 1, further comprising:
   a scent creation module connected to the processor and configured to provide a selectable aroma proximate to the tower.

8. The virtual greeter system of claim 1, further comprising:
   a counter module configured to detect and count visitors and amount of time at the tower.

9. The virtual greeter system of claim 1, further comprising:
   a radio frequency identification module connected to the processor and configured to detect radio frequency identification tags.

10. The virtual greeter system of claim 1, further comprising:
    a quick response code scanner or display connected to the processor and configured to provide quick response code interaction.

11. The virtual greeter system of claim 1, further comprising:
    a near field communication module connected to the processor and configured to interact via near field communication with proximate devices.

12. The virtual greeter system of claim 1, further comprising:
    a podium or counter between the screen and the base.

13. The virtual greeter system of claim 1, further comprising:
    a touch screen connected to the processor for interaction with the virtual greeter system.

14. The virtual greeter system of claim 13, wherein the touch screen is part of the screen such that it appears as if the virtual person is holding the touch screen.

15. The virtual greeter system of claim 1, further comprising:

a mounting configuration for the projector internal to the tower; and a vertical and horizontal adjustment mechanism for the mounting configuration.

16. A virtual greeter system, comprising:

a projector housed in a tower;

a screen attached or supported by a base coupled to the tower, the screen comprising projection film thereon, wherein the projector is positioned to display images of a person onto the projection film;

a processor communicatively coupled to the projector, a network interface, a data store, input/output interfaces, and memory; and instructions that, when executed, cause the processor to:
    display video from the projector onto the screen, the video comprising a virtual person with hand, eye, and mouth movements; and
    provide audio coincident with the video from the virtual person; and a scent creation module connected to the processor and configured to provide a selectable aroma proximate to the tower.

\* \* \* \* \*